UNITED STATES PATENT OFFICE.

WILLIAM WADE, OF LOUISVILLE, ASSIGNOR OF ONE-HALF, BY DIRECT AND MESNE ASSIGNMENTS, TO HENRY M. MORROW AND W. N. WILLIAMS, BOTH OF OMAHA, NEBRASKA.

COMPOSITION FOR BRICKS.

SPECIFICATION forming part of Letters Patent No. 468,404, dated February 9, 1892.

Application filed April 25, 1891. Serial No. 390,474. (No specimens.)

*To all whom it may concern:*

Be it known that I, WILLIAM WADE, a citizen of the United States, residing at Louisville, in the county of Cass and State of Nebraska, have invented certain new and useful Improvements in Kiln-Burned Paving and Building Blocks and in Composition Therefor; and I hereby declare the following to be a full, clear, and exact description of the same, such as will enable others skilled in the art to apply the invention.

My invention relates to the production of a hard, dense, substantially non-absorbing non-vitrified composition block, and which has great resistance to crushing and abrasive force, which renders it peculiarly fitted for paving, building, and like purposes.

The invention, generally stated, consists in a kiln-burned block composed of potters' clay and a natural earth or sand containing an insoluble silicate of alumina and the alkalies, such as is found in the bluffs on the south bank of the Platte river, in Cass county, Nebraska. Any character of potters' clay or its equivalent may be used for the bulk of the brick; but for purposes of economy I prefer to employ the commoner kinds usually employed in the manufacture of low grades of stoneware, and which is therefore of little value. The potters' clay in itself has not sufficient fluxing qualities, and this is supplied by the peculiar natural earth which I combine therewith. This earth is found in the village of Louisville, Cass county, Nebraska, on the east and west sides of the village, in the bluffs along the south bank of the Platte river. A qualitative analysis of said earth shows that it is of the general character of sand and contains an insoluble silicate of alumina, together with soda, potash, lime, magnesia, and a trace of iron, and, owing to its constituents, is very easily fused. Its natural condition in the banks is in a loose state, like sand. It also absorbs water readily, like sand; but after being moistened it dries hard, like cement. When mixed with the potters' clay, it renders the mass more porous, so that it dries more rapidly and with less loss. It also in burning enables the heat of the kiln to be increased more rapidly and with greater safety. This earth fuses at about the temperature required to fuse the slip clay found at Albany, New York, which is commonly used as a stoneware-glaze, or at substantially the temperature required for iron-stone china, which temperatures are well known to those skilled in the art. When fused, it combines with the clay to give the kiln-burned composition the texture and appearance of stone.

In carrying out my invention the natural earth hereinbefore specified may be mixed with the potters' clay in any desired proportions, which will in a measure be determined by the use to which the article produced is to be put; but for paving-blocks and like purposes I have found that a mixture composed of eighty-five per cent. of the entire bulk of Louisville potters' clay and fifteen per cent. of the entire bulk of the specified natural earth produces the best result. I have also found that when the amount of the natural earth hereinbefore specified greatly exceeds one-third the bulk of the mixture the value of the brick produced is lessened for paving and building purposes, and also that with the increase of the proportion of clay in the mixture so must the heat of the kiln be increased, while with the increase of the natural earth in the mixture the heat of the kiln must be proportionately decreased. The mixture of clay and the natural earth specified should be thorough and intimate, and may be accomplished by running the ingredients through the ordinary clay-crusher or in any other suitable manner. The composition of clay and natural earth hereinbefore specified having been molded to the desired shapes, may be burned in the usual kilns and will require from four (4) to seven (7) or even more days, according to the condition of the atmosphere, the energy and ability of the fireman, and the quantity and character of the potters' clay in the mixture. In general the rules governing the burning of said composition blocks are those commonly applicable to burning brick, and are well known to those skilled in the art; but, while in burning vitrified brick it is the practice to maintain the temperature of the kiln for some time after it has been raised to the proper temperature, in the burning of my composition-brick the temperature is not maintained, but is simply brought to the fusing-point of the earth contained in the mixture and is then stopped. This temperature and the time required for raising the kiln thereto can be readily ascertained by using trial pieces covered with a slip of Albany slip clay. As soon as the slip clay on the trial piece reaches its deepest black and begins to lose its color the burning of the composition block hereinbefore described is complete and the firing of the kiln must cease.

The product when completed will be found to have the following characteristics: It has the appearance and texture of a good grade of sandstone, especially Colorado sandstone, but is practically non-porous, so that if submerged in water for forty-eight (48) hours it will only absorb .012 per cent. of its own weight. It weighs about one hundred and forty-five pounds to the cubic foot, or about as heavy as a good quality of sandstone, is strong and difficult to break, and as hard as granite, so that it will cut glass and will resist a steel drill.

Having thus described my invention, what I claim, and desire to secure by Letters Patent, is—

1. A composition for kiln-burned blocks, consisting of an admixture of potters' clay and a natural earth consisting of sand containing an insoluble silicate of alumina and the alkalies and which has the characteristics hereinbefore specified, substantially as and for the purposes set forth.

2. A composition for kiln-burned bricks, consisting of eighty-five per cent. (85 %) of potters' clay and fifteen per cent. (15 %) of the natural earth hereinbefore specified, consisting of sand containing an insoluble silicate of alumina and the alkalies, substantially as and for the purposes set forth.

In testimony whereof I affix my signature, in presence of two witnesses, this 13th day of April, 1891.

WILLIAM WADE.

Witnesses:
I. C. BACHELOR,
JOHN T. WILLIAMS.